May 14, 1929.  T. F. BARTON  1,713,211
SYSTEM OF ELECTRIC DISTRIBUTION
Filed Sept. 5, 1924
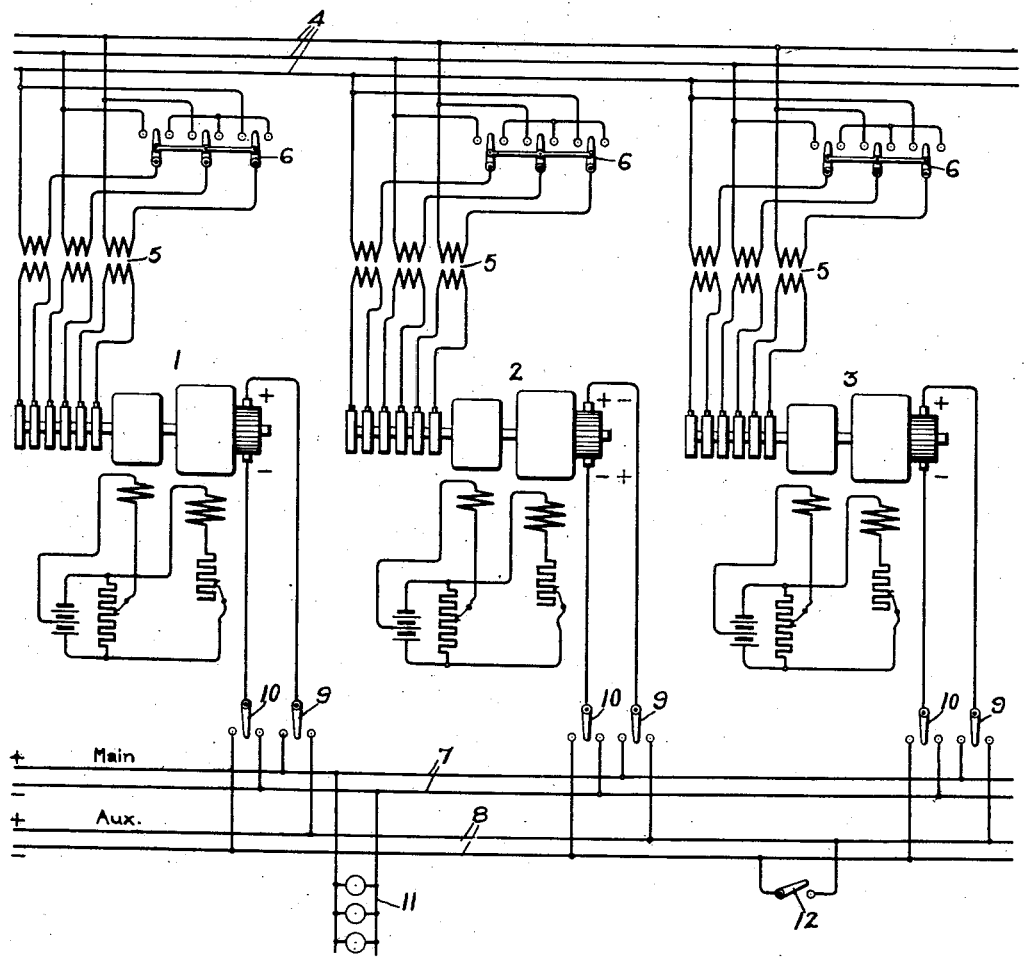
Inventor:
Theophilus F. Barton;
by
His Attorney.

Patented May 14, 1929.

1,713,211

UNITED STATES PATENT OFFICE.

THEOPHILUS F. BARTON, OF SCHENECTADY, NEW YORK, ASSIGNOR TO GENERAL ELECTRIC COMPANY, A CORPORATION OF NEW YORK.

SYSTEM OF ELECTRIC DISTRIBUTION.

Application filed September 5, 1924. Serial No. 736,159.

My invention relates to electric distribution systems and more particularly to direct current networks. Due to the great load which is permanently connected to such net works, it is very difficult to restore the voltage of the network to its normal value after a complete shut down occurs, especially when the network is supplied by rotary converters since it is impossible to vary the direct current voltage of a converter over a wide range.

One object of my invention is to provide an improved arrangement of apparatus and method of operating the same, whereby the voltage of a direct current network or other load circuit fed by rotary converters or other converting or generating apparatus may be restored after a complete shut down.

My invention will be better understood from the following description, taken in connection with the accompanying drawing of which the single figure shows it in diagrammatic form and its scope will be pointed out in the appended claims.

Referring to the drawing which shows one embodiment of my invention, the numerals 1, 2 and 3 each represent a rotary converter of the well-known booster type. Each converter is arranged to be connected to a polyphase supply circuit 4 by means of a separate bank of transformers 5. In order that the voltage impressed upon each converter may be varied, a suitable switching means 6 is provided with each transformer bank 5 whereby the primary windings thereof may be connected either in delta or in star. Any other suitable switching means, however, may be used for controlling the alternating current voltage impressed upon the circuit supplying each converter.

The positive direct current brush of each converter is arranged to be connected to the positive side of two direct current busses 7 and 8 by means of a suitable switching device 9 associated therewith and the negative direct current brush of each converter is arranged to be connected to the negative side of the two busses 7 and 8 by a suitable switching device 10. As shown, the bus 7 is assumed to be the main bus to which the network represented by the load 11 is permanently connected. It is evident, however, that suitable switching means may be provided for connecting the network to either bus if such an arrangement is desired.

The auxiliary bus 8 is provided with a bus tie switch 12 which, when closed, connects together the positive and negative sides of the auxiliary bus 8.

The method of operating the apparatus shown for restoring the voltage across the main bus 7, when all of the rotary converters are disconnected therefrom, is as follows:

All of the converters are started from the alternating current supply circuit 4 with their respective switches 9 and 10 open. The primary windings of the transformer bank 5 of one of the converters, for example the converter 1, are connected in delta and the primary windings of the transformer bank 5 of another one of the converters, for example converter 2, are connected in star and this star connected converter is made to operate with reverse polarity. Then the excitation of the boosters of these converters 1 and 2 is varied so that the voltage difference between their direct current voltages is a predetermined value, preferably zero. Since the primary windings of the transformer bank 5 for the converter 1 are connected in delta whereas the primary windings of the transformer bank 5 for the converter 2 are connected in star, the voltages of the secondary circuits of the two banks of transformers are different, the secondary voltage of transformer bank 5 for converter 1 being the greater. Therefore, in order to make the direct current voltages of the converter 1 and 2 substantially equal it is necessary to have the booster of the converter 1 operate bucking and the booster of the converter 2 operate boosting.

As soon as the voltage difference between the two converters 1 and 2 has been adjusted to the desired value the switches 9 and 10 of the two converters 1 and 2 and the switch 12 are closed so that the difference between the direct current voltages of the converters 1 and 2 is impressed across the bus 7. The exact sequence in which the switches 9 and 10 of each converter and the switch 12 are closed is immaterial so long as all of these switches are not closed until the voltage difference has been adjusted to the desired value. Under the conditions assumed the switch 9 of the converter 1 is closed so as to connect the positive brush of the converter 1 to the positive side of the main bus 7, the switch 10 of the converter 1 is closed so as to connect the negative brush of the converter 1 to the negative side of the auxiliary bus 8, the switch 9 of the converter 2 is closed so as to connect the brush thereof, which under normal operating conditions is positive, to the positive side of the auxiliary bus 8, and the switch 10 of the converter 2 is closed so as to connect the brush thereof, which under normal operating conditions is negative, to the negative side of the main bus 7. Since the converter 2 is operating with reverse polarity, it is evident that, when the switch 12 is closed and the switches 9 and 10 of the converters 1 and 2 have been closed in the above manner, the two converters are connected in series with each other so that their direct current voltages are in opposite directions and the difference between the two direct circuit voltages is impressed across the main bus 7.

The excitation of one or both of the boosters is then varied to increase the voltage impressed across the main bus. This result is accomplished by varying the excitation of the booster of the converter 1 to decrease the bucking effect thereof so that alternating current voltage impressed upon the alternating current winding of the converter 1 is increased, and by varying the excitation of the booster of the converter 2 to decrease the boosting effect thereof so that the alternating current voltage impressed upon the armature current winding of the converter is decreased. The voltage across the main bus 7 is increased in this manner until a value is reached whereby the converter 3, which has been started, can be connected directly across the main bus 7 without excessively overloading the converter. The switches 9 and 10 of the converter 3 are then closed so as to connect the converter 3 directly across the main bus 7, the converter 3 preferably being operated at its minimum direct current voltage. With the arrangement shown, the minimum direct current voltage of the converter 3 is obtained by connecting the primary windings of the transformer bank 5 of the converter 3 in star and operating the booster of the converter so that it produces its maximum busking effect.

From this point it is simply a question of connecting more converters (not shown) to the main bus in the same manner that converter 3 is connected until a sufficient number have been connected thereto to supply the demand, and then gradually increasing the voltage to normal by varying the excitation of all of the converters connected to the main bus.

As soon as a sufficient number of other converters have been connected directly to the bus to supply the demand, the switches 9 and 10 of the converters 1 and 2 are operated so as to disconnect these converters from across the bus 7. The converters 1 and 2 then may be connected directly to main bus to help supply the network, it being obvious that it is necessary to equalize the direct current voltages of the converters with the voltage across the main bus before the connections thereto are established.

While I have, in accordance with the patent statutes, shown and described my invention as applied to a particular system, and as embodying various devices diagrammatically indicated, changes and modifications will be obvious to those skilled in the art, and I, therefore, aim in the appended claims to cover all such changes and modifications as fall within the true spirit and scope of my invention.

What I claim as new and desire to secure by Letters Patent of the United States is:—

1. The method of increasing the voltage of an electric circuit after all of the sources have been disconnected therefrom which consists in connecting two of the sources in series across the circuit with their voltages in opposition and varying the voltage of one of said two sources with respect to the other to increase the voltage impressed across said network, and connecting another source across the network when the voltage across said network has been raised to a desired value.

2. The method of restoring the voltage of a network, after all of the sources have been disconnected therefrom which consists in connecting two of the sources in series across the network with their voltages in opposition, varying the voltage of each one of said two sources with respect to the other to increase the voltage impressed across said network, and connecting another source across the network when the voltage across said network has been raised to a desired value.

3. The method of restoring the voltage of a direct current network which is adapted to be supplied by a plurality of rotary converters which consists in connecting the direct current brushes of two of said rotary converters in series across the network so that the voltage impressed across the network is the difference between the direct current voltages of the two converters, and then varying the direct current voltage of one converter with respect to the direct current voltage of the other converter.

4. The method of restoring the voltage of a direct current circuit which is adapted to be supplied by a plurality of rotary converters, which consists in operating one converter with the normal polarity, operating another converter with reverse polarity, connecting said two converters in series across the direct current circuit, and varying the direct current voltage of one of said two-series-connected converters with respect to the direct current voltage of the other.

5. The method of restoring the voltage of a direct current network which is adapted to be supplied by a plurality of rotary converters which consists in connecting the direct current brushes of two of said plurality of rotary converters in series across the network so that the voltage impressed across the network is the difference between the voltage of the two converters, and then varying the alternating current voltage impressed on one of said two converters to increase the voltage impressed on said network.

6. The method of restoring the voltage of a direct current network which is adapted to be supplied by a plurality of booster type rotary converters, which consists in operating one of said plurality of converters from an alternating current circuit having a certain voltage, operating another one of said converters from another alternating current circuit having a different voltage, adjusting the excitation of the boosting units of said two converters so that the difference between the direct current voltages of the two converters is a predetermined value, connecting the direct current brushes of the two converters in series across said network so that the voltage impressed on the network is the difference between the direct current voltages of the two converters, and varying the excitation of the boosting units of the two converters to increase the voltage impressed across the network to a value whereby other converters may be connected directly to the network.

7. The method of restoring the voltage of a direct current network which is arranged to be supplied by a plurality of booster type rotary converters which consists in operating one of said converters from a delta connection operating another one of said converters from a star connection adjusting the boosters of the two converters so that the difference between the direct current voltages of the two converters is a desired value, connecting the direct current brushes of said two converters in series across said network so that the voltage impressed thereon is the difference between the direct current voltages of the two converters, varying the direct current voltages of the two converters by varying the excitation of the boosting units of the two converters until the voltage impressed across the network reaches a value that allows the connecting of a third converter to the network without excessively overloading it, and then connecting a third converter to the network.

8. In a system of electric distribution in which a plurality of sources of current are adapted to be connected to a common network, an arrangement for restoring the voltage of the network after all of the sources have been disconnected therefrom comprising means for connecting two of said sources in series across said network with their voltages in opposition, means for varying the voltage of one of said two sources with respect to the other, and means for connecting one of said sources directly to the network.

9. In a system of electric distribution in which a plurality of sources of current are adapted to be connected to a common network, an arrangement for restoring the voltage of the network after all of the sources have been disconnected therefrom comprising means for connecting any two of said sources in series across said network with their voltages in opposition, means for varying the voltage of each source whereby the resultant voltage impressed on the network by two serially connected sources may be varied, and means for connecting each source directly to the network.

10. In a system of electric distribution in which a plurality of rotary converters are adapted to supply current in multiple to a direct current network, an arrangement for restoring the voltage of the network comprising switching means for varying the direct current voltage of two of said converters and switching means for connecting the direct current brushes of said two converters in series across said network so that the voltage impressed across said network is the difference between the voltages of the two converters.

11. In a system of electric distribution in which a plurality of rotary converters are adapted to supply current in multiple to a direct current network, an arrangement for restoring the voltage of the network comprising means for independently varying the alternating current voltage impressed on two of said converters, switching means for connecting the direct current brushes of said two converters in series across said network so that the voltage impressed on said network is the difference between the direct current voltages of said converters and switching means for connecting the direct current brushes of the other of said converters across said network.

12. In a system of electric distribution, an alternating current supply circuit, two direct current busses, two rotary converters, switching means associated with each converter for connecting the associated converter to the alternating current supply circuit so that different alternating current voltages may be impressed on each converter, switching means for independently connecting each direct current brush of each converter to the corresponding sides of said direct current busses, and switching means for connecting together the positive and negative sides of one of said busses.

13. In a system of electric distribution, a polyphase supply circuit, a direct current circuit, a plurality of booster type rotary converters, switching means for connecting each converter to said supply current so that either delta or star voltage may be supplied thereto, switching means for connecting the direct current brushes of two of said converters in series across said direct current circuit so that the voltage impressed thereon is the difference between the direct current voltage of said two converters, and switching means for connecting the direct current brushes of another of said converters directly across said direct current circuit.

14. In a system of electric distribution, a polyphase supply circuit, a plurality of booster type rotary converters, switching means for connecting each converter to said supply circuit so that either delta or star voltage may be supplied thereto, two direct current busses, switching means for connecting each brush of each machine to the corresponding side of either bus, and switching means for connecting together the two sides of one of said busses.

In witness whereof, I have hereunto set my hand this 4th day of September, 1924.

THEOPHILUS F. BARTON.